(12) United States Patent
Johnston

(10) Patent No.: US 10,799,067 B2
(45) Date of Patent: Oct. 13, 2020

(54) PIVOTING SHELF ASSEMBLY

(71) Applicant: Merkur Holdings Limited, Ngau Tau Kok, Kowloon (HK)

(72) Inventor: Todd Johnston, Fairburn, GA (US)

(73) Assignee: MERKUR HOLDINGS LIMITED, Ngau Tau Kok, Kowloon (HK)

( * ) Notice: Subject to any disclaimer, the term of this patent is extended or adjusted under 35 U.S.C. 154(b) by 374 days.

(21) Appl. No.: 15/330,989

(22) Filed: Feb. 22, 2018

(65) Prior Publication Data

US 2018/0235401 A1   Aug. 23, 2018

Related U.S. Application Data

(60) Provisional application No. 62/461,904, filed on Feb. 22, 2017.

(51) Int. Cl.
*A47J 37/07* (2006.01)
(52) U.S. Cl.
CPC .................. *A47J 37/0786* (2013.01)

(58) Field of Classification Search
CPC ... A23B 4/052; A47J 37/0786; A47J 37/0704; A47J 37/0713; A23L 5/10
See application file for complete search history.

(56) References Cited

U.S. PATENT DOCUMENTS

| 4,307,672 A | 12/1981 | Shikimi | |
|---|---|---|---|
| 2011/0283992 A1* | 11/2011 | DeMars | A47J 37/0786 126/41 R |

\* cited by examiner

*Primary Examiner* — Lee A Holly
(74) *Attorney, Agent, or Firm* — McClure, Qualey & Rodack, LLP

(57) ABSTRACT

A barbecue grill and shelf assembly in which the grill has a cooking chamber. A hollowed bracket is attached to the cooking chamber and has a tube secured thereto and defining a hollow interior. A shelf with a distal end and a proximal end has a cylindrical post depending downwardly from the proximal end, whereby the post is received in the tube for pivotally mounting the shelf to the cooking chamber. The hollowed bracket serves to insulate the shelf mount and the securing mechanism from the heat of the cooking chamber.

9 Claims, 4 Drawing Sheets

PIVOTING SHELF ASSEMBLY

CROSS-REFERENCE TO RELATED APPLICATION

This application claims benefit to U.S. provisional patent application Ser. No. 62/461,904, filed on Feb. 22, 2017, which is incorporated by reference herein.

BACKGROUND

Outdoor cooking is a very popular activity. Many people have one or more outdoor cooking grills, each designed to serve a different cooking function. For example, gas and charcoal grills are used to cook many different items of food. Smoker grills, such as the popular horizontal offset smoker, are used to smoke meat and other foods for long periods of time.

Most outdoor barbecue grills and smokers come with side shelves that the chef uses to hold food to be prepared, food that has already been cooked, utensils, condiments, and various additional cooking paraphernalia.

Prior art side shelves are known in the art. Versions are available that fold up and down, that pivot from one position to another, and which are detachable altogether. Shelves which are pivotable suffer from certain drawbacks. For example, the shelf may be able to pivot but will then interfere with the operation of the grill. In addition, the pivot mechanisms are generally unwieldy and difficult to maneuver. Furthermore, the mechanisms may become so hot, due to their construction and placement, to become unusable.

It is to the improvement of a pivoting shelf assembly that the present disclosure is directed.

SUMMARY

The present disclosure teaches a pivoting shelf assembly that can be mounted to a stationary fixture, such as an outdoor kitchen counter, or to a movable article, such as a wheeled grill cart.

In a representative embodiment, the present shelf is mounted to a barbecue grill and can be moved through various positions in an approximate 180°-270° arc. The shelf can be secured in any desired position throughout this arc, utilizing an adjustment mechanism that can be operated with one hand. The shelf, in any of its adjusted positions, does not interfere with the operation of the grill or the space that the chef needs to cook food on the grill.

DETAILED DESCRIPTION

Figure 1:
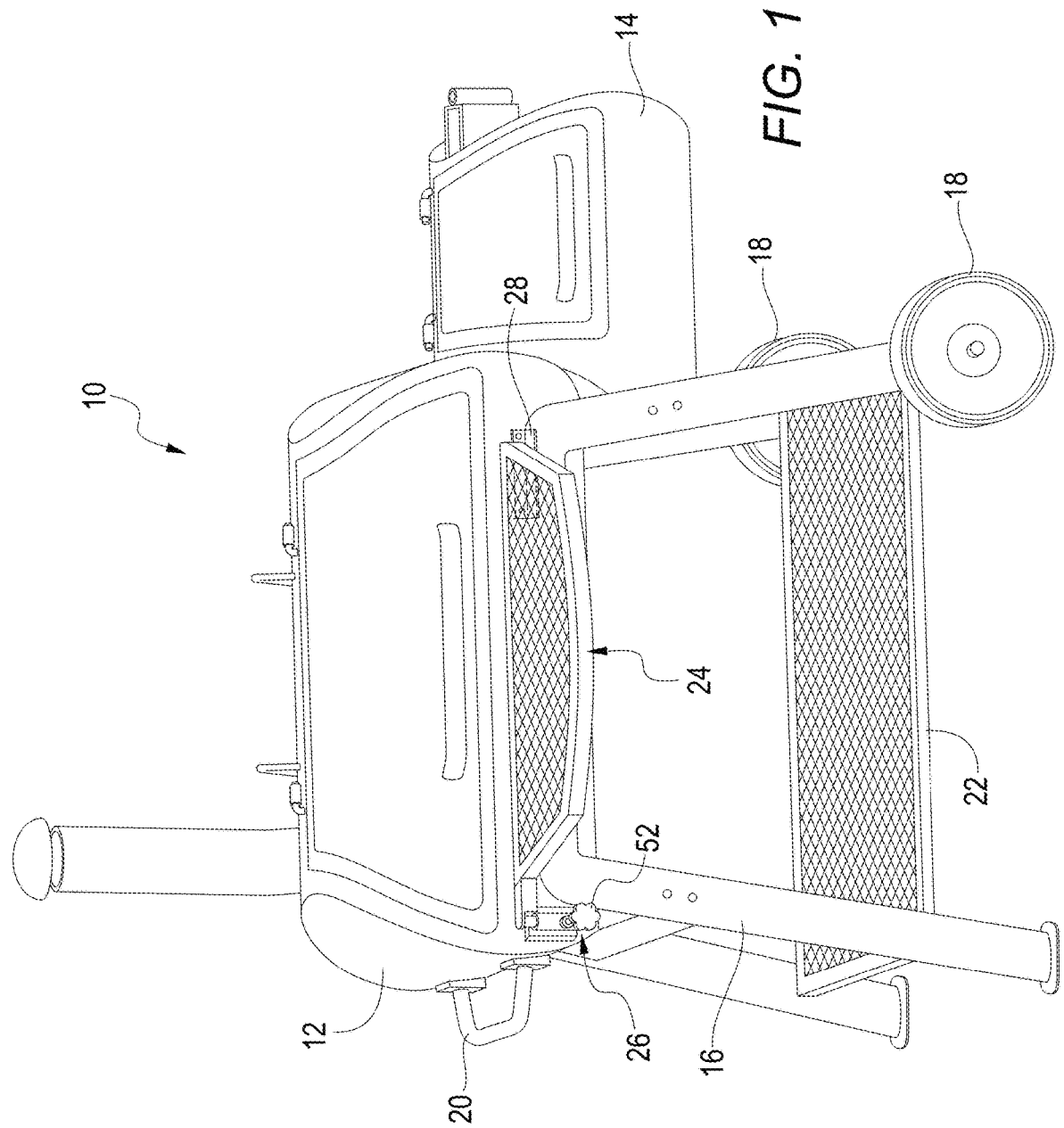
FIG. 1 is a front elevational view of a smoker grill on a wheeled cart, with the pivoting shelf deployed at the front.
Figure 2:
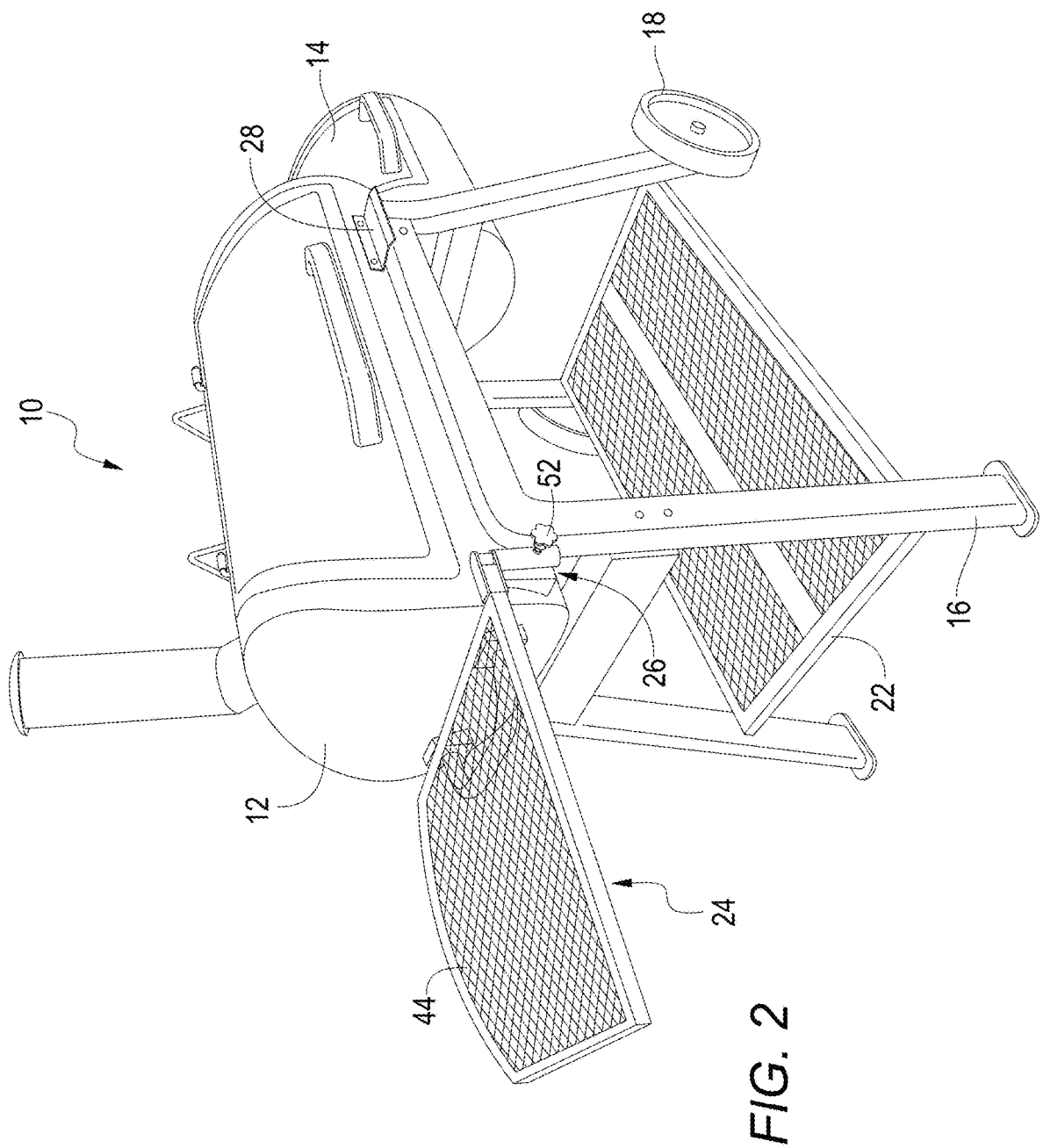
FIG. 2 is a perspective view of the grill and cart, with the shelf deployed to one side.

In one of many possible embodiments, the shelf is mounted to a barbecue grill cart, or to the grill itself, for providing an adaptive work surface for the grill user. This embodiment is shown in the attached drawing figures. FIG. 1 shows the shelf attached to a barbecue grill and deployed in the front of the grill. FIG. 2 shows the same shelf mounted to the same grill but deployed to a side of the grill. While shown on only one side of the grill, the pivoting shelf assembly can be deployed on one or both sides, and in the front or back of the grill.

The present shelf can also be mounted to the cart, in any desirable location, such as one or more of the cart legs. In addition to grill carts, the present shelf assembly can be secured to gardening carts, or other types of carts, and also to vehicles, boats, stationary structures such as decks or walls, and in other places where a work or storage surface is desired. The shelf can be made from any suitable material, such as metal, wood, plastic, composites, or the like. Further, while illustrated as being deployed in a horizontal orientation, the shelf assembly can be rotated to a generally vertical orientation for storage or during periods of non-use.

Figure 3:
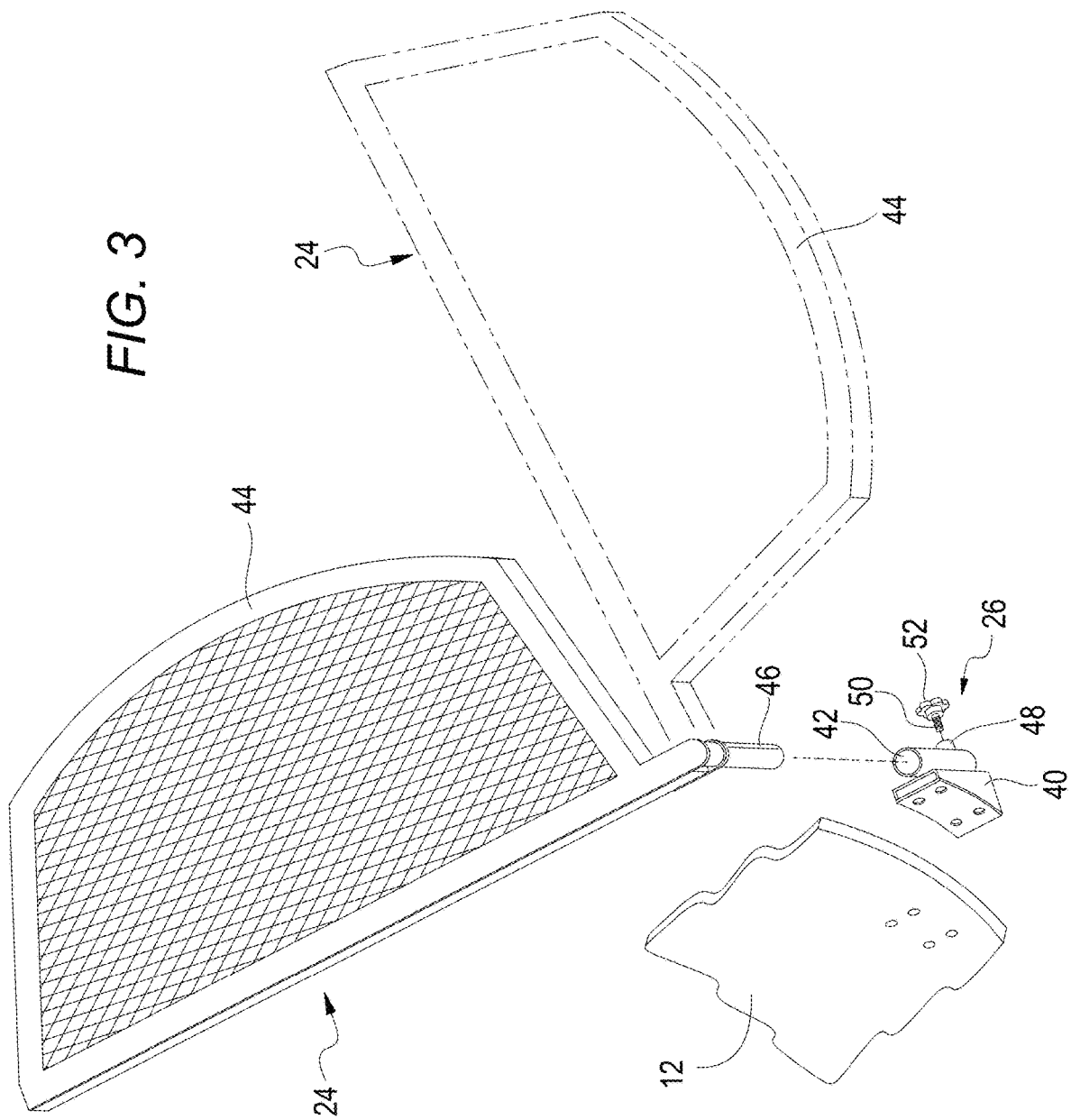
FIG. 3 is an exploded view of the shelf mounting assembly.

Referring to FIG. 3, a mounting bracket assembly of suitable size and strength is shown. The assembly can be secured by welding, bolts, or other suitable fastening means. Extending radially from the plate is an open-ended cylindrical member or tube with a threaded fitting on one side thereof.

The shelf has an extension on one of the edges, from which depends a post that is designed and shaped to allow insertion in the cylindrical member. The post is rotatable within the cylindrical member for rotating the attached shelf through an approximate one hundred eighty through two hundred seventy degree (180°-270°) arc. This permits the shelf to be deployed either in the front of the grill or along the side, as shown in FIGS. 1 and 2, respectively, or in an intermediate position, as shown by the shelf in phantom lines, in FIGS. 3 and 4. The mounting bracket assembly, the post, and any associated hardware are comprised of a suitable heat-resistant metal or other suitable material.

Disposed within the threaded hole in the cylindrical member is a locking bolt with a knob that can be rotated by hand to either loosen the connection to remove the shelf or to permit it to pivot to a different location. Tightening the bolt secures the shelf in the selected location.

Various additional feature and advantages of the present pivoting shelf assembly are shown in the appended drawings.

Referring more specifically to the drawings, and to FIG. 1 in particular, numeral 10 designates generally a smoker grill. More particularly, the grill shown is known in the art as a horizontal offset smoker. The unit has a horizontally disposed cooking chamber 12 and an offset fire box 14. The fire box is connected to the cooking chamber via a port (not shown), through which heat and smoke enter the cooking chamber to slowly cook the food therein. In one mode of operation, charcoal or other fuel is ignited in the fire box and the food to be cooked is placed on cooking grates inside the cooking chamber 12. Such units may also be used to directly cook food in the cooking chamber by placing charcoal or another heating medium below the cooking grates in the cooking chamber and directly grilling the food therein.

Smoker 10 is shown on a cart 16, which can be equipped with wheels 18 and a handle 20, which is used for positioning the smoker in a desired location. In the embodiment shown, the cart has a bottom shelf 22 which is generally used for storage. Such smokers may also be powered electrically or employ a gas burner fueled by liquid propane or natural gas.

FIG. 1 shows a pivoting shelf assembly 24, located along the front side of the cooking chamber 12. The shelf is disposed at a level so as to not interfere with the opening or closing of the door to the cooking chamber. The shelf assembly 24 is secured at one end with a bracket assembly, which will be explained in greater detail hereinbelow. At the end opposite the bracket assembly, an L shaped brace is secured to the cooking chamber, to support the free end of the shelf when it is disposed in position along the front of the cooking chamber.

Details of the bracket assembly are shown in FIG. 3. Mounting bracket 40, has a hollow interior with an air gap 41, a shape complimentary to the shape of the cooking chamber, and is secured to the cooking chamber by any suitable means, such as bolts, rivets, welding, etc. Secured to the mounting bracket is a cylindrical tube 42. Depending from the proximal end of the shelf 44 is a cylindrical post 46. The post 46 is received in cylindrical tube 42, the fit being such that the shelf 44 can pivot or rotate within the tube and thereby be moved to any desired position. A tapped fitting 48 is provided on the front side of the cylindrical tube with the threads extending through the fitting 48 and the wall of the cylindrical tube. The tapped fitting accommodates a bolt 50, the head of which is formed into a thumb wheel 52. The bolt is loosened to allow the shelf 44 to pivot from one position to another and is tightened to secure the shelf in the desired position.

As shown in FIG. 2, the shelf can be pivoted from the front of the grill to the side, thereby serving as a side shelf. Movement of the shelf is easily accomplished with one hand, the user simply loosening the bolt with the thumb wheel, moving the shelf to a desired position, and tightening the thumb wheel to secure the shelf in its adjusted position.

As can be seen from the drawings, the use of hollowed mounting bracket 40, air gap 41, and the cylindrical tube 42, which project radially away from the cooking chamber, provide a significant measure of insulation from the cooking chamber, which can be hot, depending on the mode of operation (grilling vs. smoking), thereby insuring that the adjustment mechanism i.e. the thumb wheel, remains cool to the touch. This differs from known prior art designs in which the adjustment mechanism was disposed in close proximity or even beneath the cooking chamber, where its associated parts could become hot and dangerous to the touch.

Figure 4:
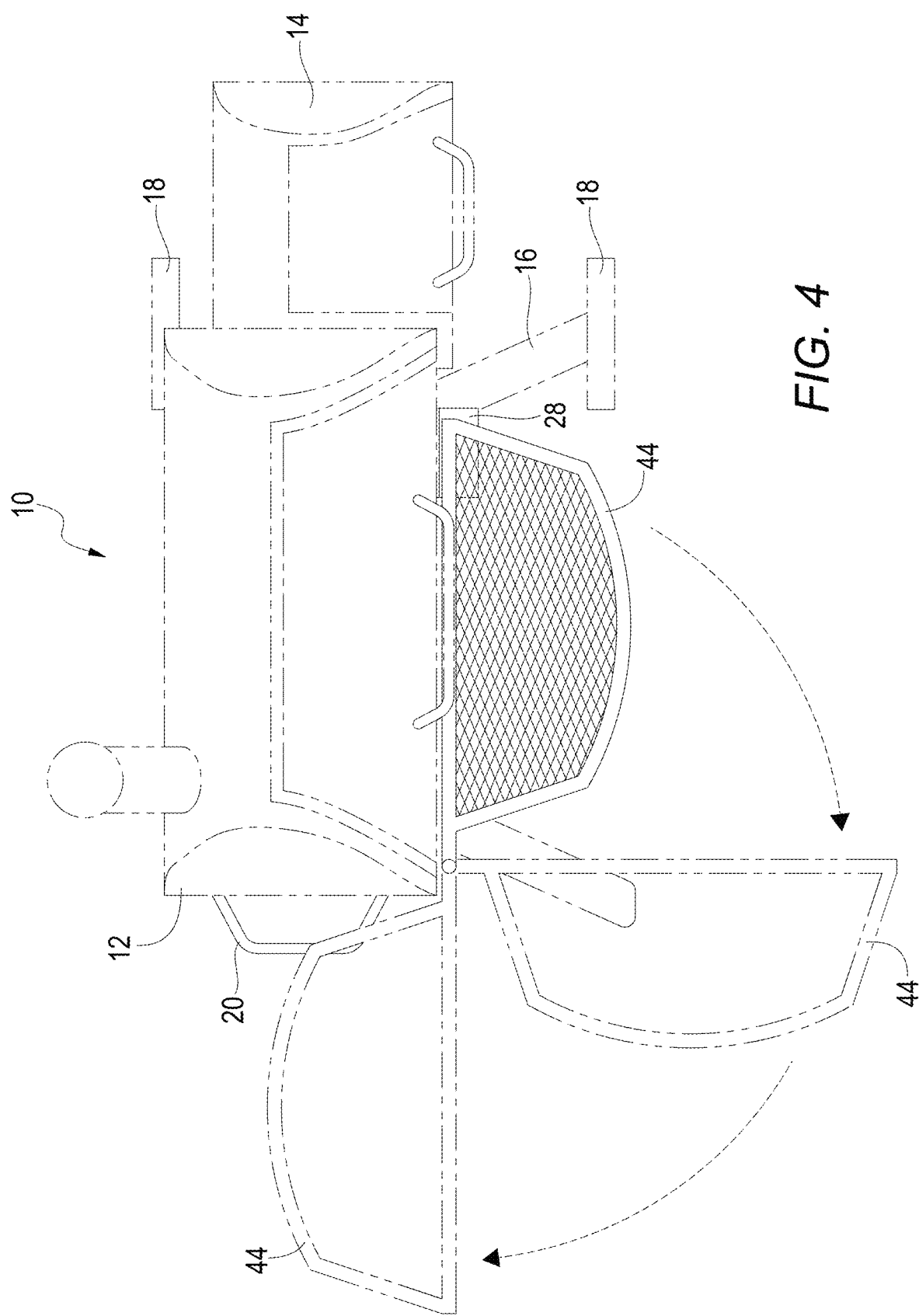
FIG. 4 is a top plan view, partially in phantom lines, showing various deployment positions.

The shelf 44 is shown in an intermediate position, here drawn in phantom lines, in FIG. 3. This illustrates the versatility of the present device and illustrates one of many ways in which it can be used by a chef cooking food in the smoker. Similarly, FIG. 4 illustrates the shelf assembly deployed in 3 different positions around the perimeter of the grill. The chef thus has multiple options to obtain an optimal location.

While an embodiment of a pivoting shelf assembly, and modifications thereof, have been shown and described in detail herein, various additional changes and modifications may be made without departing from the scope of the present disclosure.

10. smoker
12. cooking chamber
14. fire box
16. cart
18. wheels
20. handle
22. bottom shelf
24. shelf assembly
26. bracket assembly
28. L-shaped brace
40. mounting bracket
41. air gap
42. cylindrical tube
44. front/side shelf
46. post
48. tapped fitting
50. bolt
52. thumb wheel

I claim:

1. A pivoting shelf assembly for use with a barbecue grill, the grill having a cooking chamber, the pivoting shelf assembly comprising:
    a bracket secured to the cooking chamber;
    a cylindrical tube attached to said bracket and extending radially therefrom;
    a shelf having a distal end and a proximal end;
    a post depending from said proximal end and being rotationally journaled in said tube for pivoting said shelf from a first position to a second position;
    a tapped fitting extending from said tube and in communication therewith; and
    a locking bolt engaged with said fitting for securing said shelf in a fixed position.

2. The pivoting shelf assembly as defined in claim 1 in which said bracket includes an air gap to insulate said tube from the heat of the cooking chamber.

3. The pivoting shelf assembly as defined in claim 1 and including a bracket secured to said cooking chamber for supporting said distal end of said shelf.

4. A barbecue grill and shelf assembly in which the grill has a cooking chamber, comprising a hollowed bracket attached to said cooking chamber and having an outer surface, a tube secured to said outer surface and defining a hollow interior, a shelf having a distal end and a proximal and with a cylindrical post depending downwardly from said proximal end, whereby said post is received in said tube for mounting said shelf to said cooking chamber.

5. The barbecue grill and shelf assembly as defined in claim 4 and including a tapped fitting extending from said tube and in communication therewith, a locking bolt engaged with said fitting for securing said shelf in a fixed position, and an adjustment mechanism forming a head for said bolt for tightening or loosening the bolt.

6. The barbecue grill and shelf assembly as defined in claim 5 in which said bracket includes an air gap to insulate said adjustment mechanism from the heat of the cooking chamber.

7. The barbecue grill and shelf assembly as defined in claim 6 and including a bracket secured to said cooking chamber for supporting said distal end of said shelf.

8. The barbecue grill and shelf assembly as defined in claim 4 in which said bracket includes an air gap to insulate said adjustment mechanism from the heat of the cooking chamber.

9. The barbecue grill and shelf assembly as defined in claim 4 and including a bracket secured to said cooking chamber for supporting said distal end of said shelf.

* * * * *